United States Patent [19]

Mann

[11] Patent Number: 4,950,867
[45] Date of Patent: Aug. 21, 1990

[54] WELDING GUN CONNECTOR

[76] Inventor: Robert N. Mann, c/o Bob Mann & Associates Inc., 1725/3 Matheson Blvd., Mississauga, Ontario, Canada, L4W 1Z1

[21] Appl. No.: 307,921

[22] Filed: Feb. 9, 1989

[51] Int. Cl.⁵ .............................................. B23K 9/00
[52] U.S. Cl. ............................... 219/137.31; 219/136
[58] Field of Search .............................. 138/121, 122; 219/137.41, 137.31, 137.51

[56] References Cited

U.S. PATENT DOCUMENTS

| | | | |
|---|---|---|---|
| 2,556,187 | 6/1951 | Ingalls | 138/122 |
| 3,197,611 | 7/1965 | Morris | 219/137.51 |
| 4,643,229 | 2/1987 | Hickin | 138/121 |

Primary Examiner—Clifford C. Shaw
Attorney, Agent, or Firm—Sim & McBurney

[57] ABSTRACT

A bellows-like connector is used to join the downstream end of a smooth-surfaced welding gun conduit and the upstream end of a welding gun head to permit the welding gun head to be moved universally relative to the conduit. Resilient rings are located internally of the bellows to resist radially-inward deformation.

6 Claims, 2 Drawing Sheets

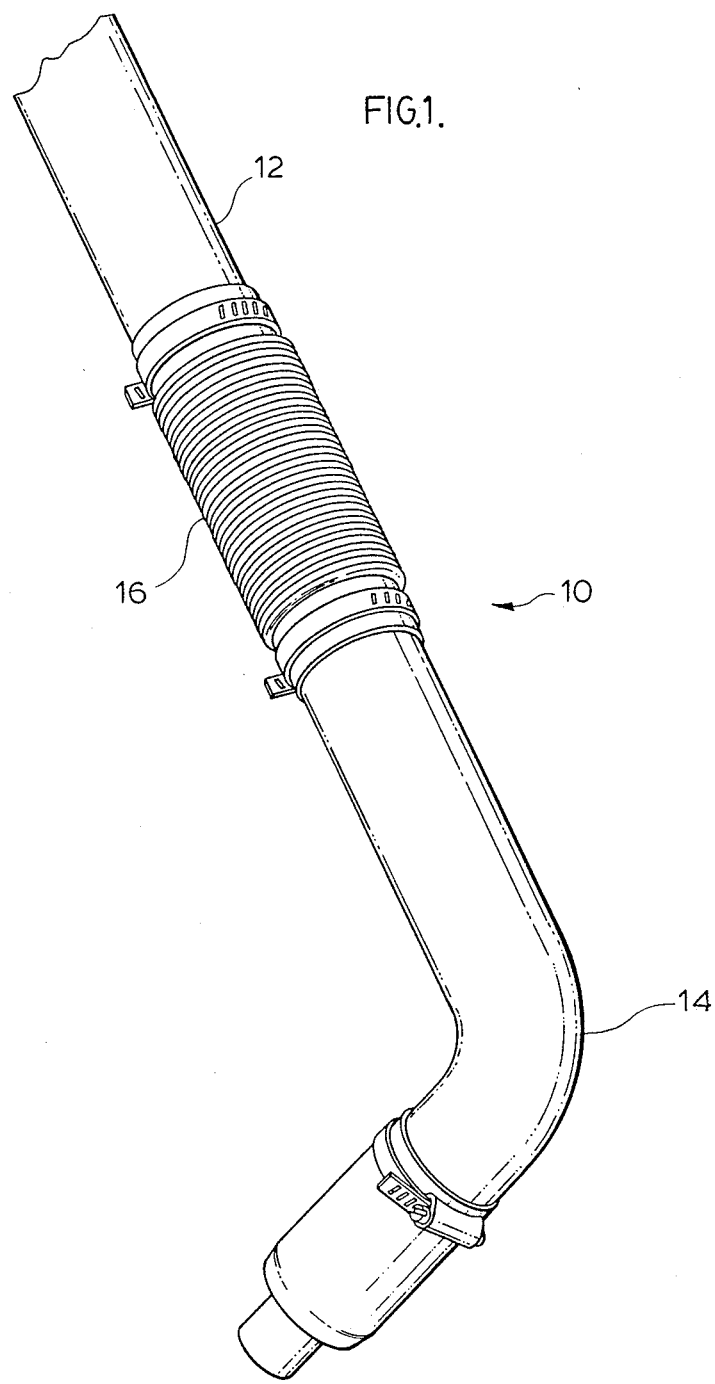

WELDING GUN CONNECTOR

FIELD OF INVENTION

The present invention relates to welding guns.

BACKGROUND TO THE INVENTION

Welding guns for application of a weld to a desired site generally are provided at the remote end of a conduit in which is located a continuous weld wire extending from a wire source and a power cable extending from a power source. Often such welding guns are of the vacuum type which permit undesirable fumes to be removed from the welding site through the conduit.

Traditionally, this conduit has been of corrugated construction along the whole length thereof, but such structure provides no support for the weld wire or power cable and can wear through to expose the electrical power cable. In my U.S. Pat. No. 4,496,823, there is described a novel multipassage flexible smooth-surfaced conduit which overcomes the problems of the prior art.

In some instances, however, the conduit of my U.S. Pat. No. 4,496,823 is not sufficiently flexible to permit the ideal manoeuvrability of the welding gun head to make welds, particularly in hard-to-get-at locations.

SUMMARY OF INVENTION

In accordance with the present invention, there is provided a novel welding gun arrangement in which a smooth-surfaced flexible conduit is joined to a welding gun head through a bellows-like flexible connector to permit the welding gun to be turned almost universally with respect to the conduit. Such bellows-like connector is provided with resilient rings located integrally of the device, so that radially-inward deformation under the influence of inwardly-directed pressure is resisted.

BRIEF DESCRIPTION OF DRAWINGS

FIG. 1 is a perspective view of a welding gun arrangement in accordance with one embodiment of the invention;

DESCRIPTION OF PREFERRED EMBODIMENT

Figure 4:
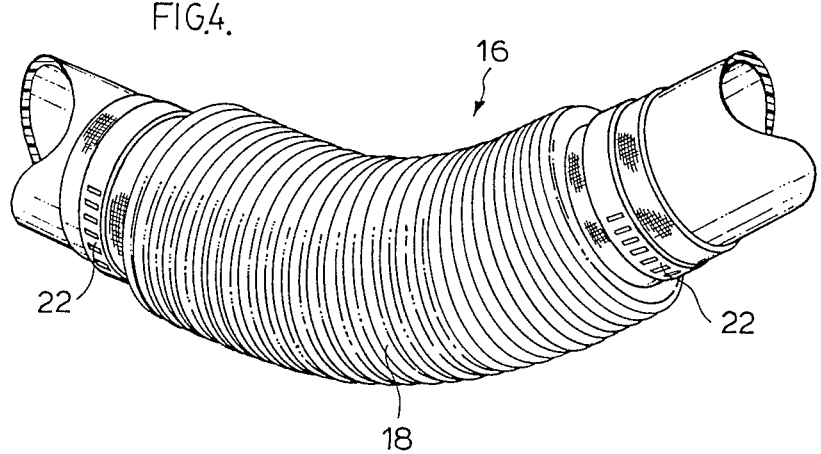
FIG. 4 is a perspective view of the connector illustrating flexure thereof.
Figure 3:
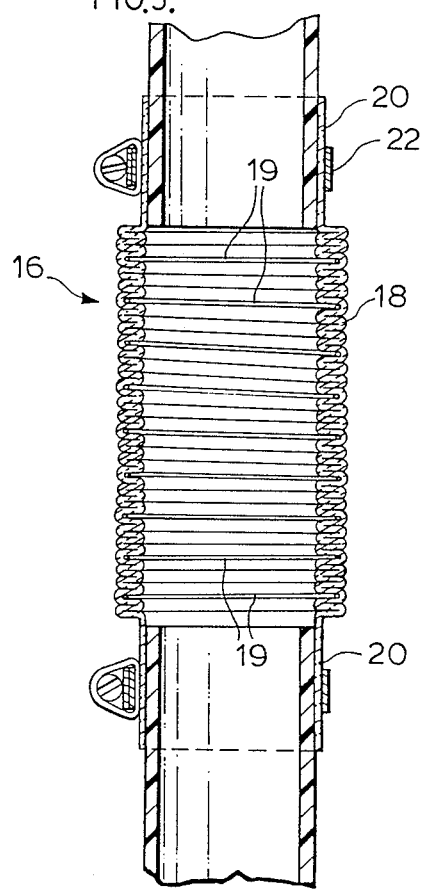
FIG. 3 is a sectional view of the connector of FIG. 2.
Figure 2:
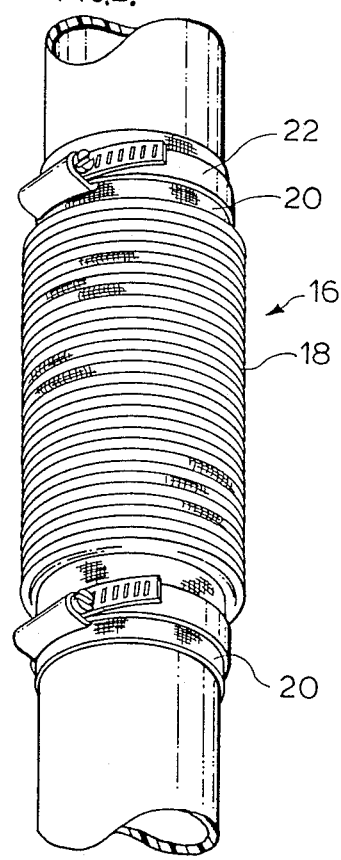
FIG. 2 is a perspective view of the connector used in the welding gun arrangement of FIG. 1.

Referring to the drawings, there is shown therein a welding gun arrangement 10 in accordance with one embodiment of the invention. The welding gun arrangement 10 comprises a conduit 12, a welding gun head 14 and a bellows connector 16 connecting the downstream end of the conduit 12 to the upstream end of the welding head 14.

The conduit 12 is a smooth-surfaced tube for conveying power and welding rod from a remote location to the welding gun head 14. The conduit 12 preferably takes the form described in my U.S. Pat. No. 4,496,812, the disclosure of which is incorporated herein by reference, for a fume-extruding welding gun head 14.

The welding gun head 14 may be any convenient welding gun head to effect welding at a site. Preferably, the welding gun head 14 is of the fume-extracting type and preferably takes the form described in my U.S. Pat. No. 4,727,238, the disclosure of which is incorporated herein by reference.

The bellows connector 16 comprises a plurality of individual bellows elements 18 which are integrally joined to each other so as to be resiliently flexible and permit universal movement of the welding gun head 14 with respect to the conduit 12. By providing for universal movement of the connector 16 by means of the bellows 18, an extreme flexibility of positioning of the welding gun head 14 relative to the conduit 12 results, providing to the welder, not only the advantages of the smooth-surfaced conduit 12 but also the advantage of flexibility of location of welding gun head 14 at the welding site.

To prevent inadvertent crushing and collapse of the bellows 16 in use, such as may occur when the welding gun is gripped at the connector, a series of resilient rings 19 is provided spaced apart substantially equally along the length of the connector 16. The rings are located in the apices of individual ones of the bellows elements 18.

The connector 16 is joined to the conduit 12 and the welding gun head 14 in any convenient manner. As illustrated, the downstream end of the conduit 12 and the upstream end of the welding gun head 14 extend snugly respectively into tubular extensions 20 of the bellows connector 16 and clamps 22 surround and are tightened onto the extensions 20 to grip the conduit 12 and welding gun head 14 respectively.

SUMMARY OF DISCLOSURE

In summary of this disclosure, the present invention provides a novel welding gun arrangement which permits, through the use of a bellows connector, more flexibility of location of a welding gun head when a smooth-surfaced relatively inflexible conduit is employed while resistance to inadvertent crushing is achieved using resilient rings. Modifications are possible within the scope of this invention.

What I claim is:

1. A welding gun, comprising:
    a welding gun head for applying a weld to a site,
    a conduit for an electrical power cable to said welding gun head,
    flexible bellows connection means connecting said welding gun head to said conduit to permit said welding gun head to be moved universally relative to said conduit, and
    a plurality of resilient rings disposed integrally and at longitudinally-spaced locations along the length of said bellows connection means to resist deformation of said bellows connection means upon the external application of radially-inward pressure thereto.

2. The welding gun of claim 1 wherein said flexible bellows connection means is of generally cylindrical shape and comprising a plurality of individual bellows members integrally joined one to another to be resiliently flexible.

3. The welding gun of claim 2 wherein said resilient rings are located at the radially-inward apex of individual ones of said individual bellows members.

4. The welding gun of claim 3 wherein there is a lesser plurality of said resilient rings than of said individual bellows means and said resilient rings are substantially equally spaced apart along the length of said bellows connection and located in said apices.

5. The welding gun of claim 4 wherein said flexible bellows connection means includes elongate smooth surfaced tubular portions at each longitudinal end thereof to effect connection to said welding gun head and said conduit.

6. The welding gun of claim 5 wherein the downstream end of said conduit extends snugly into one of said tubular portions and the upstream end of said welding gun head extends snugly into the other of said tubular portions and clamps surround and are tightened to said tubular portion to effect a secure connection.

* * * * *